No. 615,490. Patented Dec. 6, 1898.
A. METTERNICH.
HEADLIGHT REFLECTOR.
(Application filed Oct. 1, 1897.)
(No Model.)
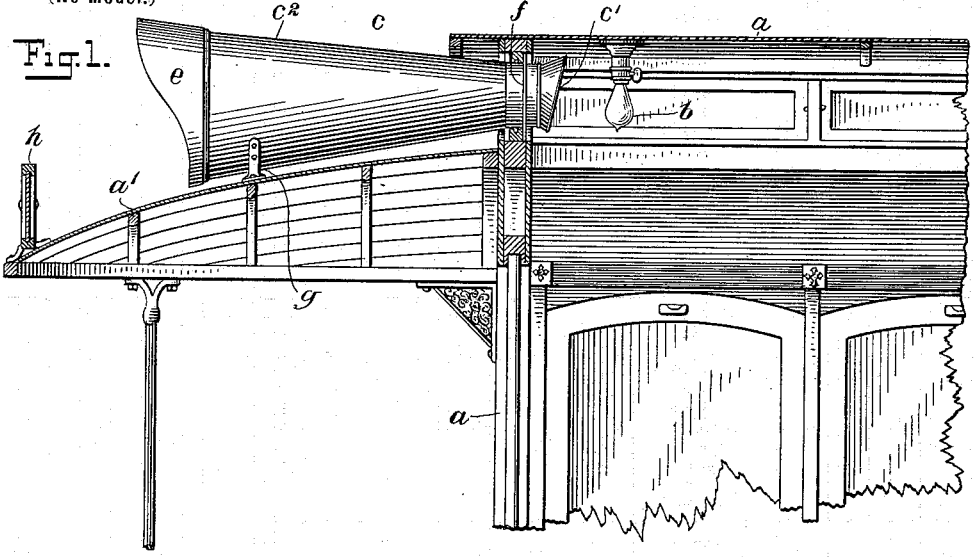
Fig. 1.
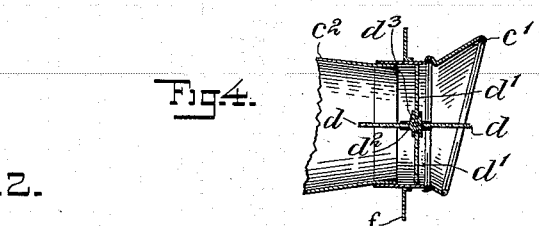
Fig. 4.
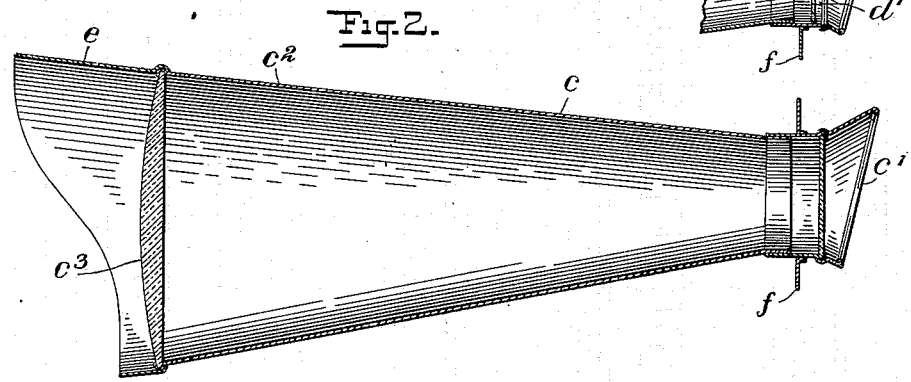
Fig. 2.
Fig. 3.
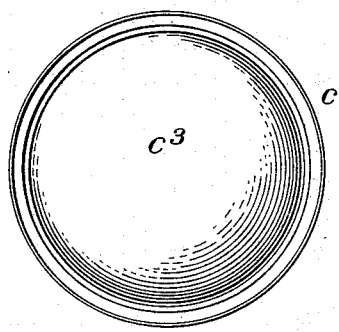
WITNESSES:
Geo. W. Naylor
B. E. Swaine
INVENTOR
Andrew Metternich
BY
Chas. F. Dane
his ATTORNEY
THE NORRIS PETERS CO., PHOTO-LITHO., WASHINGTON, D. C.

UNITED STATES PATENT OFFICE.

ANDREW METTERNICH, OF NEWARK, NEW JERSEY.

HEADLIGHT-REFLECTOR.

SPECIFICATION forming part of Letters Patent No. 615,490, dated December 6, 1898.

Application filed October 1, 1897. Serial No. 653,674. (No model.)

*To all whom it may concern:*

Be it known that I, ANDREW METTERNICH, a citizen of the United States, and a resident of Newark, Essex county, State of New Jersey, have invented a new and useful Headlight-Reflector, of which the following description, taken in connection with the drawings herewith accompanying, is a specification.

This invention relates to headlight-reflectors for street or railway cars, which in the present instance are more particularly adapted for use on those cars employing electricity as their motive power. In the latter class of cars, usually termed "electric" cars, the electric current is so regulated as to furnish only the necessary power for five interior lamps, which is the required number to properly light the car. In case one of these lamps is removed from the interior of the car to a position on the roof of the car to serve as the customary headlight the remaining lamps do not give that degree of light which is desirable, to supply which it becomes necessary to use oil or other similar lamps.

Having in mind the above facts, it has been the principal object of this invention to provide a cheap, simple, and effective means for use in combination with one of the lamps within a car, whereby a portion of the light from such lamp may also be directed and utilized at a point outside of the car to serve as the usual exterior headlight and such latter function be performed without diminishing the light within the car. This object I secure by means of the construction and arrangement of parts embodying my invention, as hereinafter set forth in detail, and pointed out in the claim.

Referring to the accompanying drawings, Figure 1 represents a portion of a street-railway car, partly in section, provided with a headlight-reflector constructed and arranged according to my invention. Fig. 2 is an enlarged view of the reflector, in vertical longitudinal section, detached from the car. Fig. 3 is an end view of the same, and Fig. 4 is a detail view to be hereinafter referred to.

To explain in detail, $a$ represents an upper end portion of an ordinary street-railway car, $b$ one of the usual electric lamps supported from the roof or ceiling of such cars, and $c$ my improved headlight-reflector. This reflector $c$, according to my invention, consists of an elongated tubular piece of metal or other suitable material which is adapted to be secured at a point between its ends in the wall of the car, with one end $c'$ extending into the latter to a point adjacent to or opposite the lamp $b$ and its opposite end $c^2$ projecting outside the car to a point adjacent to the forward end of the roof $a'$ over the platform of the car, as clearly shown in Fig. 1. Each of the opposite ends $c'$ and $c^2$ of this reflector flares outwardly from a point where the latter passes through the wall of the car, as shown. By this construction the said inner end $c'$ serves as a reflector to throw or direct the light from the lamp $b$ into the car, and also forms an enlarged mouth or opening, through which the light from the said lamp may be received into the reflector and reflected from the enlarged forward end $c^2$ of the latter through a lens $c^3$, supported therein. It will thus be obvious that by means of the reflector $c$, constructed and arranged as described, the light from a lamp within the car may be utilized at a point outside of the latter in a desired position above the platform of the car to provide the usual headlight and perform such function not only without decreasing the light within the car, but also by reason of its inner flaring end directing the light from the adjacent lamp downward into the car, where it is most required. Such a construction in a car employing electrically-lighted lamps, where the current is only sufficient to supply a certain required number of lamps, as before referred to, is especially desirable and valuable.

I also usually employ in combination with the reflector $c$ movable transparencies of different colors for changing the color of the light directed through the reflector, according to the direction in which the car may be traveling. These transparencies in the present instance illustrated consist of pieces of glass $d$ $d$ and $d'$ $d'$, which are secured in a frame $d^2$, which is mounted on a rod $d^3$, extending across the reflector, as clearly shown in Fig. 4. By turning the frame $d^2$ upon the rod $d^3$, so as to cause either the glass $d$ $d$ or $d'$ $d'$ to extend across the reflector, the color reflected through the headlight will be changed, and such change from one to the other of two different colors is usually made as the direction of travel is changed, so that the direction of travel of the car may be noted from a distance.

The reflector $c$, as herein shown, is provided with a hood $e$ at the forward end thereof, which projects forward of the lens $c^3$ as a protection for the latter in case of storm or otherwise; but this hood may be employed or dispensed with, as desired.

As a simple means of securing the reflector in connection with the car I have provided the same with a peripheral flange $f$, adjacent to its inner end, which is adapted to be secured to the car, and at its outer end support the same in a bracket $g$ on the roof of the car. At the forward end of the latter and immediately in front of the reflector $c$ I have located a vertically-arranged frame $h$, within which is supported a piece of glass or other transparent material which may bear a word or words denoting either the name of the street, direction of travel of the car, &c. Such words being on transparent material and located in front of the reflector $c$ will be thus clearly shown at night.

Having thus set forth my invention, what I claim as new, and desire to secure by Letters Patent of the United States, is—

In combination with a car having an interiorly-located lamp, of an elongated tubular reflector extending through the wall of the car with its opposite ends flaring outwardly from a point between its ends; the inner flaring end of the reflector being independent of connection with said lamp and supported in a position opposite the latter with a space between the same, and its opposite outer end extending to a desired position to utilize the light from said interior lamp as an exterior headlight, substantially as and for the purpose set forth.

ANDREW METTERNICH.

Witnesses:
CHAS. F. DANE,
B. E. SWAINE.